United States Patent
Tang et al.

(10) Patent No.: US 10,832,400 B1
(45) Date of Patent: Nov. 10, 2020

(54) VEHICLE LISTING IMAGE DETECTION AND ALERT SYSTEM

(71) Applicant: Capital One Services, LLC, McLean, VA (US)

(72) Inventors: Qiaochu Tang, The Colony, TX (US); Geoffrey Dagley, Mckinney, TX (US); Micah Price, Plano, TX (US); Avid Ghamsari, Frisco, TX (US); Jason Richard Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/742,194

(22) Filed: Jan. 14, 2020

(51) Int. Cl.
*G06K 9/00* (2006.01)
*G06T 7/00* (2017.01)
*G06K 9/62* (2006.01)

(52) U.S. Cl.
CPC ............ *G06T 7/001* (2013.01); *G06K 9/6201* (2013.01); *G06T 2207/20081* (2013.01); *G06T 2207/30248* (2013.01)

(58) Field of Classification Search
CPC ........... G06T 7/001; G06T 2207/20081; G06T 2207/30248; G06K 9/6201
See application file for complete search history.

(56) References Cited

U.S. PATENT DOCUMENTS

| | | | |
|---|---|---|---|
| 5,414,626 A | 5/1995 | Boorse et al. | |
| 7,421,322 B1 | 9/2008 | Silversmith et al. | |
| 8,548,866 B2 | 10/2013 | Varadarajan et al. | |
| 10,002,442 B1 | 6/2018 | Dagley et al. | |
| 10,026,209 B1 | 7/2018 | Dagley et al. | |
| 10,152,648 B2* | 12/2018 | Filimonova | G06K 9/00442 |
| 10,325,315 B1* | 6/2019 | Tang | G06K 9/6262 |
| 10,395,313 B1 | 8/2019 | Tang et al. | |
| 10,452,915 B1 | 10/2019 | Chikkaveerappa et al. | |
| 2004/0093284 A1 | 5/2004 | Takaoka et al. | |
| 2008/0077508 A1 | 3/2008 | Bezos et al. | |
| 2011/0270706 A1 | 11/2011 | Anspach et al. | |
| 2012/0116728 A1 | 5/2012 | Shear et al. | |
| 2012/0230548 A1 | 9/2012 | Calman et al. | |
| 2013/0222133 A1 | 8/2013 | Schultz et al. | |
| 2015/0254762 A1 | 9/2015 | Fisher | |
| 2015/0324737 A1 | 11/2015 | Chrzan et al. | |
| 2016/0163129 A1 | 6/2016 | Elnajjar | |
| 2017/0061506 A1 | 3/2017 | Dow et al. | |
| 2017/0278179 A1 | 9/2017 | Perrier et al. | |
| 2018/0249217 A1 | 8/2018 | Andrews, II et al. | |
| 2018/0260825 A1 | 9/2018 | Rashid et al. | |

(Continued)

FOREIGN PATENT DOCUMENTS

CN   107403162 A   11/2017

*Primary Examiner* — Aaron W Carter
(74) *Attorney, Agent, or Firm* — Sterne, Kessler, Goldstein & Fox P.L.L.C.

(57) ABSTRACT

An image error identification system retrieves an image associated with a vehicle listing and uses various machine learning models to classify the image and generate identification data that may include a vehicle make, model, trim level, and/or various features of the vehicle present in the image. The identification data is compared to the rest of the vehicle listing to detect a mismatch between the image and the vehicle listing. An alert is generated, when a mismatch is detected, indicating the one of the image or the data in the vehicle listing is incorrect.

20 Claims, 9 Drawing Sheets

(56) References Cited

U.S. PATENT DOCUMENTS

| | | |
|---|---|---|
| 2019/0019335 A1 | 1/2019 | Elangovan et al. |
| 2019/0172112 A1 | 6/2019 | Sierocki |
| 2019/0278994 A1 | 9/2019 | Bumpas et al. |
| 2019/0279033 A1 | 9/2019 | Price et al. |
| 2019/0279144 A1* | 9/2019 | Yang .................. G06K 7/10861 |
| 2019/0279293 A1 | 9/2019 | Tang et al. |
| 2019/0295030 A1 | 9/2019 | Candeloro, Jr. et al. |
| 2020/0050856 A1 | 2/2020 | Chikkaveerappa et al. |

* cited by examiner

VEHICLE LISTING IMAGE DETECTION AND ALERT SYSTEM

BACKGROUND

Vehicle databases of used or new vehicles available for sale are used to store and provide vehicle information to a potential buyer. Web-based interfaces may be used for exploring vehicles in a database and provide potential buyers a way to navigate, search, and display the information in the database. Vehicle listings from the database are often associated with one or more images of the vehicle for sale. Occasionally, vehicle images are incorrectly associated with a vehicle listing, leading to inconsistent and confusing information presented to the potential buyers. Vehicle image errors may range from displaying an image of the wrong vehicle trim or wrong vehicle color to displaying an image that does not show a vehicle.

BRIEF SUMMARY

In some embodiments, a method of vehicle image error identification comprises retrieving an image from a data set corresponding to an individual identifier and classifying the image to determine first identification data for the image. The method compares the first identification data to a member of the data set and generates an alert in response to a mismatch between the first identification data and the member of the data set.

In some embodiments, the retrieving of the image from the data set may include retrieving an image identifier from the data set and retrieving the image corresponding to the image identifier.

In some embodiments, the classifying of the image may include using a first machine learning model to classify the image. The first identification data comprises a first general image class. In response to a failure to classify the image in the first general image class the method may use an alternate machine learning model to classify the image. The first identification data comprises a second general image class. The method generates the alert in response to failure to classify the image in both the first general image class and the second general image class. The first general image class may include a vehicle exterior image and the second general image class may include a vehicle interior image.

In some embodiments, the classifying of the image may include using a second machine learning model to determine the first identification data including a general identifier for the image, the general identifier corresponding to one or more of multiple sub-classes within the first general image class. The method may generate the alert in response to a mismatch between the general identifier and the member of the data set. The member of the data set comprises an identifier from among the multiple sub-classes. The general identifier may represent vehicle makes or vehicle makes and models within the general image class of vehicle images.

In some embodiments, the classifying of the image may further include using a third machine learning model to determine the first identification data, the first identification data including an indication of a feature in the image and the member of the data set corresponds to the feature. The method may generate the alert in response to a mismatch between the indication of the feature in the image and the member of the data set corresponding to the feature.

In some embodiments, the method may include retrieving another image from the data set and classifying the other image to determine second identification data for the other image. The comparing of the first identification data to a member of the data set may include comparing the first identification data to the second identification data. Generating the alert may include generating an alert in response to the first identification data indicating a first general identifier corresponding to two or more sub-classes of multiple sub-classes within a first general image class, and the second identification data indicating a second general identifier corresponding to none of the two or more sub-classes of the first general identifier.

In some embodiments, the method may further include modifying the image of the data set, in response to the mismatch or modifying the member of the data set in response to the mismatch.

In some embodiments, the method may further include identifying a first modification, among two or more candidate modifications, the first modification including modifying the member of the data set and identifying a second modification, among two or more candidate modifications, the second modification including replacing the image to change the first identification data. For each of the first modification and the second modification, the method may determine a number of steps required to eliminate mismatches between the first identification data and all members of the data set. The method performs a modification, among the two or more candidate modifications, having the least number of steps.

In some embodiments, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS/FIGURES

The accompanying drawings are incorporated herein and form a part of the specification.

In the drawings, like reference numbers generally indicate identical or similar elements. Additionally, generally, the

DETAILED DESCRIPTION OF THE INVENTION

In some embodiments, the figures describe a system and method for identifying image errors and correcting image errors in listings of vehicles available for sale. Vehicle listings may be those found in a vehicle dealership database, listings for new or used vehicles, listings accessed through a web interface, vehicles listed by individual sellers on a computerized marketplace, or the like.

Figure 1:
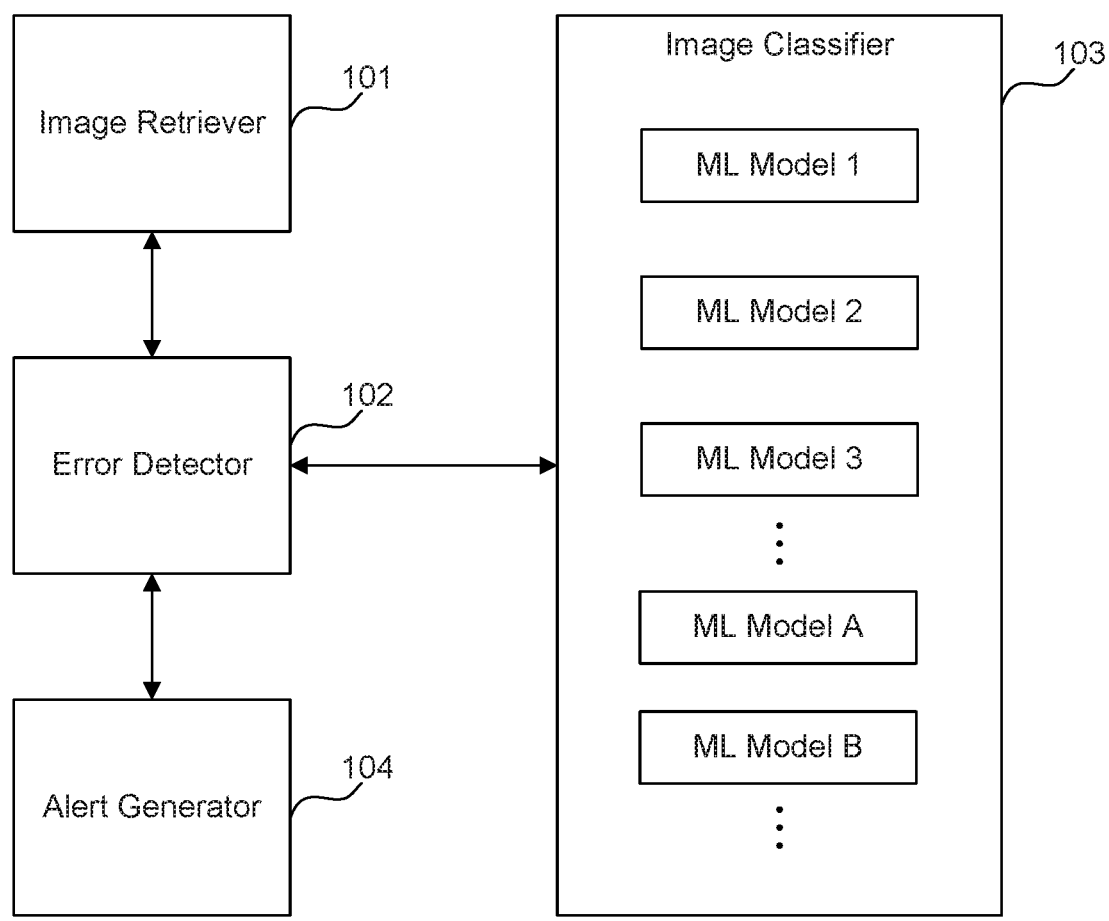
FIG. 1 is a block diagram of an image error identification system according to an embodiment.

FIG. 1 is a block diagram of an image error identification system according to an embodiment.

According to an embodiment, an image error identification system comprises components for image retriever 101, image classifier 103, error detector 102, and alert generation 104. The image retriever 101 is configured to retrieve an image associated with a data set. According to an embodiment, the data set comprises a vehicle listing data set, or data corresponding to multiple vehicle listings. The vehicle listing data set may be stored in a database and each listing in the vehicle listing data set may correspond to an individual identifier. The image may be retrieved from a data set stored locally or retrieved by way of a communication interface configured to connect to a remote data set. The image retriever 101 may be configured to retrieve the image based on a resource locator associated with the vehicle listing to retrieve the image itself directly from the vehicle listing data set.

According to an embodiment, the image classifier 103 is configured to use multiple machine learning models to classify the image. Each machine learning model may be configured to identify a different aspect of the image and classify the image based on that aspect. According to an embodiment, the machine learning models are organized in layers, where a general layer machine learning model is configured to classify the image into a general category and a specific layer machine learning model is configured to classify the image into a more specific category within the general category. Machine learning (ML) models may be nested to classify the image into various levels of specificity. For example, ML model 1, ML model 2, and ML model 3, illustrated in FIG. 1, may represent three machine learning models organized in layers, where ML model 1 is configured to classify the image as a vehicle image, ML model 2 is configured to classify the image as a make and model of the vehicle, and ML model 3 is configured to identify specific features of the vehicle make and model. Further, ML model A and ML model B may respectively be configured to classify the image as an vehicle interior image, and identify specific interior features of the vehicle.

Some machine learning models applicable to the disclosed embodiments may be configured to perform image recognition and/or image classification tasks. Image classification may include classifying an image as a vehicle image, a vehicle exterior, a vehicle interior, a three-quarters profile vehicle image or another vehicle perspective image. For some of the specific vehicle features, detecting the location of objects in an image and returning box coordinates may be preferred. Machine learning models and neural network architectures of the disclosed embodiments may include, but are not limited to, Convolutional Neural Networks (CNNs) Inception, ResNet and NASNet, Region-based CNN (R-CNN), You Only Look Once (YOLO), and Single Shot Detector (SSD). The disclosed embodiments may also employ other machine learning approaches including logistic regression, support vector machines (SVM), or tree-based methods like random forests and gradient boosting machines (GBM). Preprocessing techniques, also known as feature creation or feature transformation, may also be used to convert the pixel data of the image into features for the machine learning models to identify. Some preprocessing techniques may include, but are not limited to histogram of oriented gradients (HOG), scale-invariant feature transform (SIFT), or features from accelerated segment test (FAST). A non-neural network-based object detection method of the disclosed embodiments may include a Viola-Jones object detection framework, which uses Haar features.

Convolutional Neural Networks (CNNs) are current state-of-the-art machine learning modeling techniques for image classification problems, with other useful neural network architectures including Inception, ResNet and NASNet for image recognition, and Region-based CNN (R-CNN), You Only Look Once (YOLO), and Single Shot Detector (SSD) for object detection. It is also possible to apply other machine learning approaches including logistic regression, support vector machines (SVM), or tree-based methods like random forests and gradient boosting machines (GBM). These other machine learning approaches may involve using preprocessing techniques, such as feature creation or feature transformation, to convert the pixel data of the image into features the other machine learning approaches can operate on. These preprocessing techniques may include histogram of oriented gradients (HOG), scale-invariant feature transform (SIFT), or features from accelerated segment test (FAST).

The machine learning models may be configured to classify an image and generate identification data for the image. Identification data my include, but is not limited to an indicator of whether the image contains a vehicle image, vehicle make, vehicle model, and various interior or exterior features of the vehicle. Identification data may include one or more of a feature identifier that describes a feature of the image, a general image class (e.g., vehicle, non-vehicle, vehicle exterior, vehicle interior), a general identifier corresponding to the vehicle in the image, and/or an individual identifier for the vehicle in the image. One example of a feature that the machine learning model may be configured to detect is vehicle color.

According to an embodiment, the error detector 102 is configured to compare identification data to corresponding members of the vehicle listing data set and identify inconsistencies or errors in the image and/or details of the vehicle listing. For example, the image classifier 103 may classify an image and generate identification data including a make and model and/or a feature of a "special edition" trim package based on an externally visible feature such as a spoiler, a special badge, exclusive wheels, or color scheme. If this identified feature is inconsistent with a corresponding detail of the vehicle listing, the error detector 102 may send a signal to the alert generator 104.

According to an embodiment, the alert generator 104 is configured to generate an alert in response to the error detector 102 detecting a mismatch between the identification data of the image and a corresponding member of the vehicle listing data set. The alert generator 104 may generate an alert in the form of a message sent to the database administration, a pop-up in the web interface displaying the vehicle listing, a log report detailing one or more errors identified in the data set, or the like. According to some embodiments, generating the alert may include sending an alert message to the supplier of the database, the database administrator, or the automobile dealership using the database. Generating the alert may include displaying the alert message to a viewer of the database through a computer interface, such as a website, web application, mobile application, or other computerized display interface. The alert message may be configured to indicate that a mismatch was detected and the image may not be the correct image of the vehicle.

Figure 2:
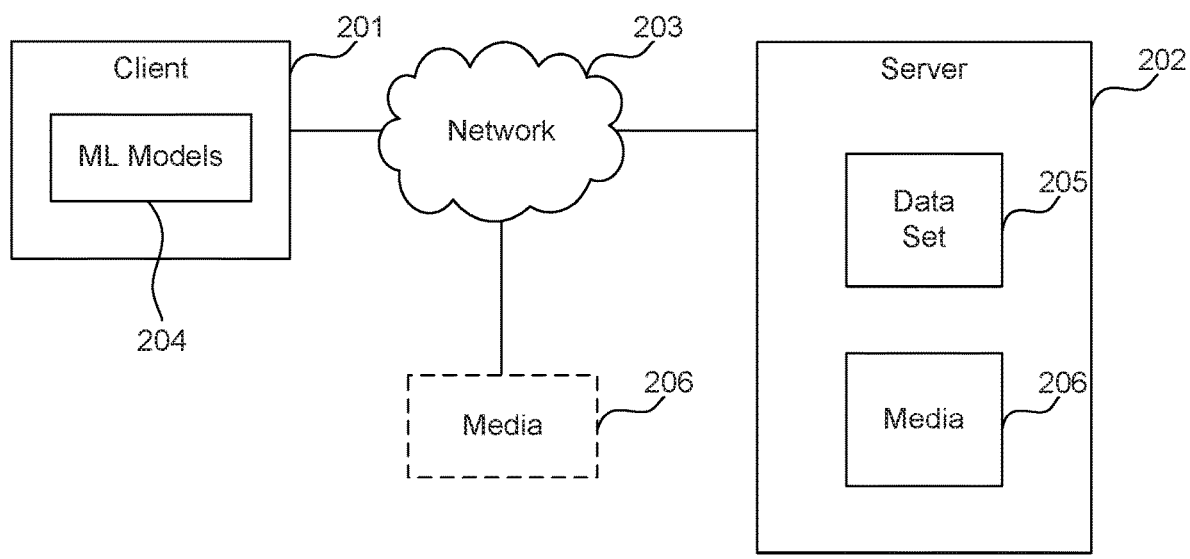
FIG. 2 is a block diagram of an image error identification system implemented in a networked computing environment according to an embodiment.

FIG. 2 is a block diagram of an image error identification system implemented in a networked computing environment according to an embodiment.

According to an embodiment, the image error identification system comprises a client, a server, and a network. The client may include the ML models 204 of the image classifier 103, and the server may include the data set 205 and media storage. The media storage may store the images of the data set. In another embodiment, the media storage may be located at a remote location and accessed through the network.

The image error identification system and each component thereof may be implemented on a single computer system, in a networked computing environment, a cloud-based computing environment, or the like based on the principles disclosed herein.

Figure 3:
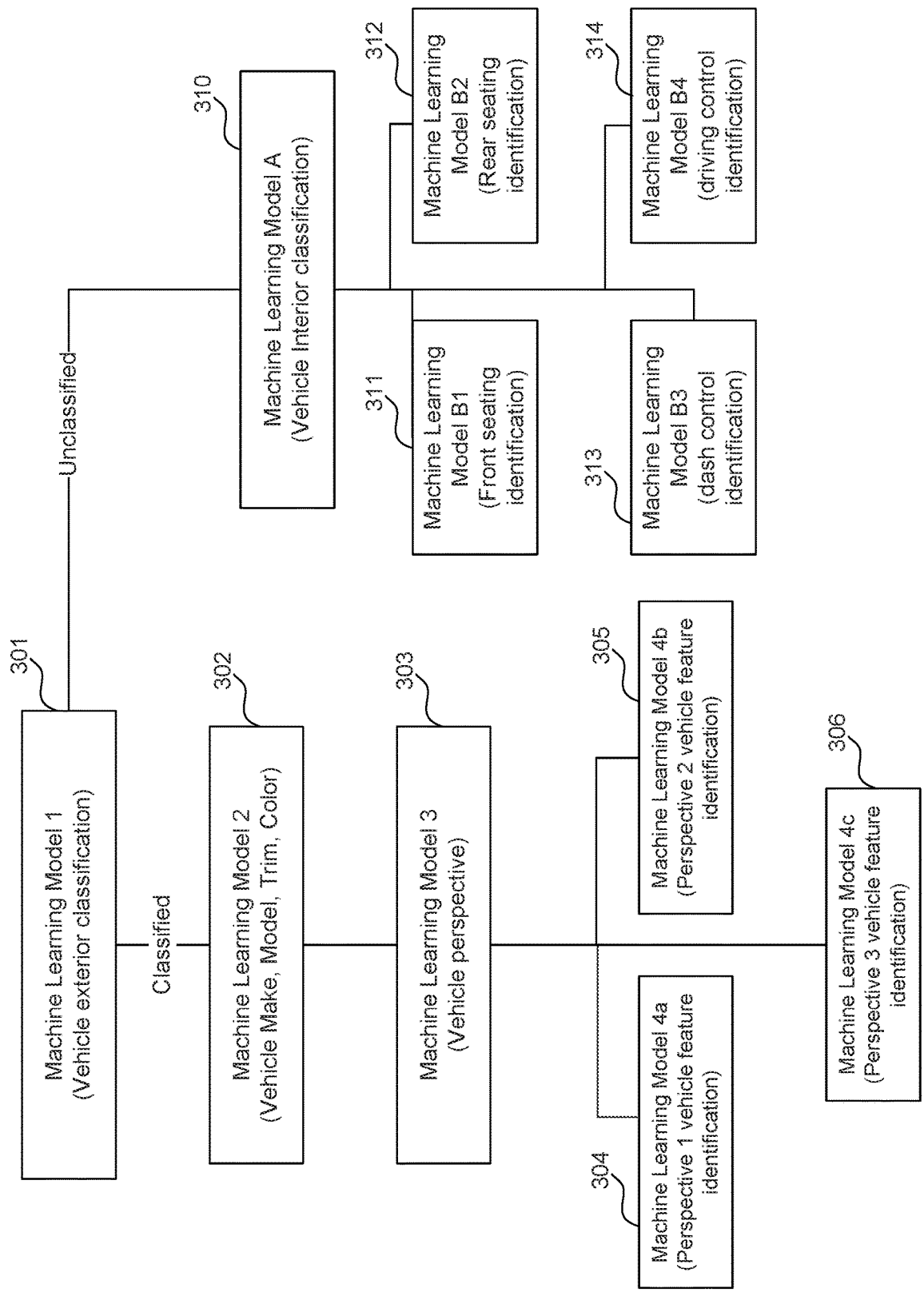
FIG. 3 is a block diagram of an image classification system used for image error identification according to an embodiment.

FIG. 3 is a block diagram of an image classification system used for image error identification according to an embodiment.

According to an embodiment, the tasks of classifying a vehicle image, identifying a feature in the vehicle image, and generating identification data of classifying vehicle images is divided into multiple sub-tasks and distributed among multiple machine learning models. Distributing image classification into separate machine learning models may narrow the range of images that each machine learning model is required to classify and may increase the operation speed, improve classification accuracy, and reduce complexity of the machine learning models. As a non-limiting example, vehicle interior images may have much more variability and complexity than vehicle exterior images, while sharing few visual similarities. Using a single machine learning model to classify all images in the full range of possible vehicle exterior and interior images can increase difficulty of training the machine learning model and reduce the total accuracy and speed of the machine learning model. However, a machine learning model that can be focused on determining if an image comprises a vehicle exterior, can filter the inputs to the machine learning model that can focus on determining if the image comprises a vehicle interior, simplifying the job of both machine learning models.

According to some embodiments, one or more machine learning models may be configured to generate identification data for an image as a result of classifying the image. Identification data may include an indication that the image contains a vehicle, a make or make and model of the vehicle, or any feature of the vehicle. Features of the vehicle image that may be included in the identification data include, but are not limited to, one or more of a viewing perspective of the vehicle in the image, a body style, trim level, body kit, special paint job, accessory rack, front or rear bumpers, hood, number of doors, rear door, spare tire, wheel size and/or spoke number, alloy wheels, exhaust accessories, spoilers, scoops, automatic/manual transmission, seat style, seating arrangement, seat material, climate control features, navigation, rear headrest screens, split rear folding seats, performance features, dashboard features, entertainment features, safety features, a sunroof or any other exterior or interior feature of a vehicle. A feature of the vehicle identified in the vehicle image may be represented in the identification data by a feature identifier.

According to an embodiment illustrated in the diagram of FIG. 3, at step 301, the image error identification system uses a first machine learning model, machine learning model 1, to classify an image and generate identification data including a first general image class. The first general image class may include vehicle exterior images. According to an embodiment, the image is classified as a vehicle if the image comprises a vehicle exterior, and the image is unclassified if the image does not contain a vehicle exterior.

According to an embodiment, the image classifier 103 sends images classified as vehicle exterior images to a second machine learning model, machine learning model 2 302, for further classification. Machine learning model 2 302 may classify the image and generate identification data including a general identifier corresponding to one or more of multiple sub-classes within the first general image class. The general identifier may include vehicle make and model within the class of vehicle exterior images. According to an embodiment, the general identifier may include vehicle color; once an image has been classified as a vehicle exterior image, a common class of image errors may be identified by using machine learning model 2 302 to detect the vehicle color. Because the image sent to machine learning model 2 has already been classified as an image including a vehicle exterior, the classification of vehicle make and model is simplified and accuracy may be improved.

According to an embodiment, an image classified as including a particular make and model of vehicle is sent to a third machine learning model, machine learning model 3 303, for further classification to generate identification data including a feature of the image. Machine learning model 3 may be configured to classify an image based on a vehicle perspective, such as a side perspective, front perspective, three-quarters perspective, rear perspective or any other perspective.

According to an embodiment, an image classified by machine learning model 3 may be sent for further classification to one or more of machine learning model 4a 304, machine learning model 4b 305, or machine learning model 4c 306, depending on which vehicle perspective the image was classified in by machine learning model 3. Each of machine learning models 4a, 4b, 4c, and 4d may be configured to identify features of the vehicle from a different perspective of the vehicle.

Different vehicle perspectives may expose different features of the vehicle in the image. For example, the wheels will be more visible in a side or three-quarters perspective than in a front perspective, while the hood and windshield are likely to be more visible from a front perspective, and the rear bumper will be entirely hidden from the front perspective. Dividing the machine learning models into different perspectives can reduce the total number of distinct features each machine learning model is required to identify.

According to an embodiment, machine learning models 4a, 4b, and 4c, are configured to identify features of the vehicle in the image including one or more of a body style, trim level, body kit, spoilers, scoops, special paint job, accessory rack, front or rear bumpers, hood, number of doors, rear door, spare tire, wheel size and/or spoke number, alloy wheels, exhaust accessories, or any other external features of a vehicle. A particular machine learning model may be configured to identify a different set of features depending on a make and model of the vehicle.

The order in which machine learning model 2 302 and machine learning model 3 303 classify the images need not be in the order illustrated in FIG. 3 and some machine learning models may be optional. For example, in some embodiments, machine learning model 3 303 may be eliminated and one or more of machine learning models 4a 304, 4b 305, or 4c 306 may be configured to further classify the image to detect individual features of the vehicle. Therefore the third machine learning model may refer to one or more of machine learning model 3 303, machine learning model 4a 304, machine learning model 4b 305, or machine learning model 4c 306. Machine learning models 4a 304, 4b 305, or 4c 306 may be configured to further classify the image in series or in parallel. According to another embodiment, the third machine learning model comprises a single machine learning model configured to identify vehicle exterior features from any perspective.

According to another embodiment, the image classifier 103 is configured to use machine learning models 4a 304, 4b 305, or 4c 306 to detect features common to all makes and models before sending the image to machine learning model 3 303 for classification by make and model.

According to an embodiment, the image classifier 103 is configured to send images not classified in the first general image class to a second machine learning model, machine learning model A 310, for classification in a second general image class. The second general image class may include vehicle interior images. The image classifier 103 may be configured to treat images that are not classified as vehicle exterior images or vehicle interior images as unclassified images or images that contain no vehicle.

According to an embodiment, the image classifier 103 is configured to send images classified as vehicle interior images to a third machine learning model including one or more of machine learning model B1 311, machine learning model B2 312, machine learning model B3 313, or machine learning model B4 314. Each of machine learning models B1, B2, B3 and B4 may be configured to detect a different set of one or more features of the vehicle interior. According to an embodiment, machine learning models B1, B2, B3, and B4 are configured to detect interior features including, but not limited to, automatic/manual transmission, seat style, seating arrangement, seat material, climate control features, navigation, rear headrest screens, split rear folding seats, performance features, dashboard features, entertainment features, safety features, a sunroof, or any other interior feature of a vehicle.

Figure 4:
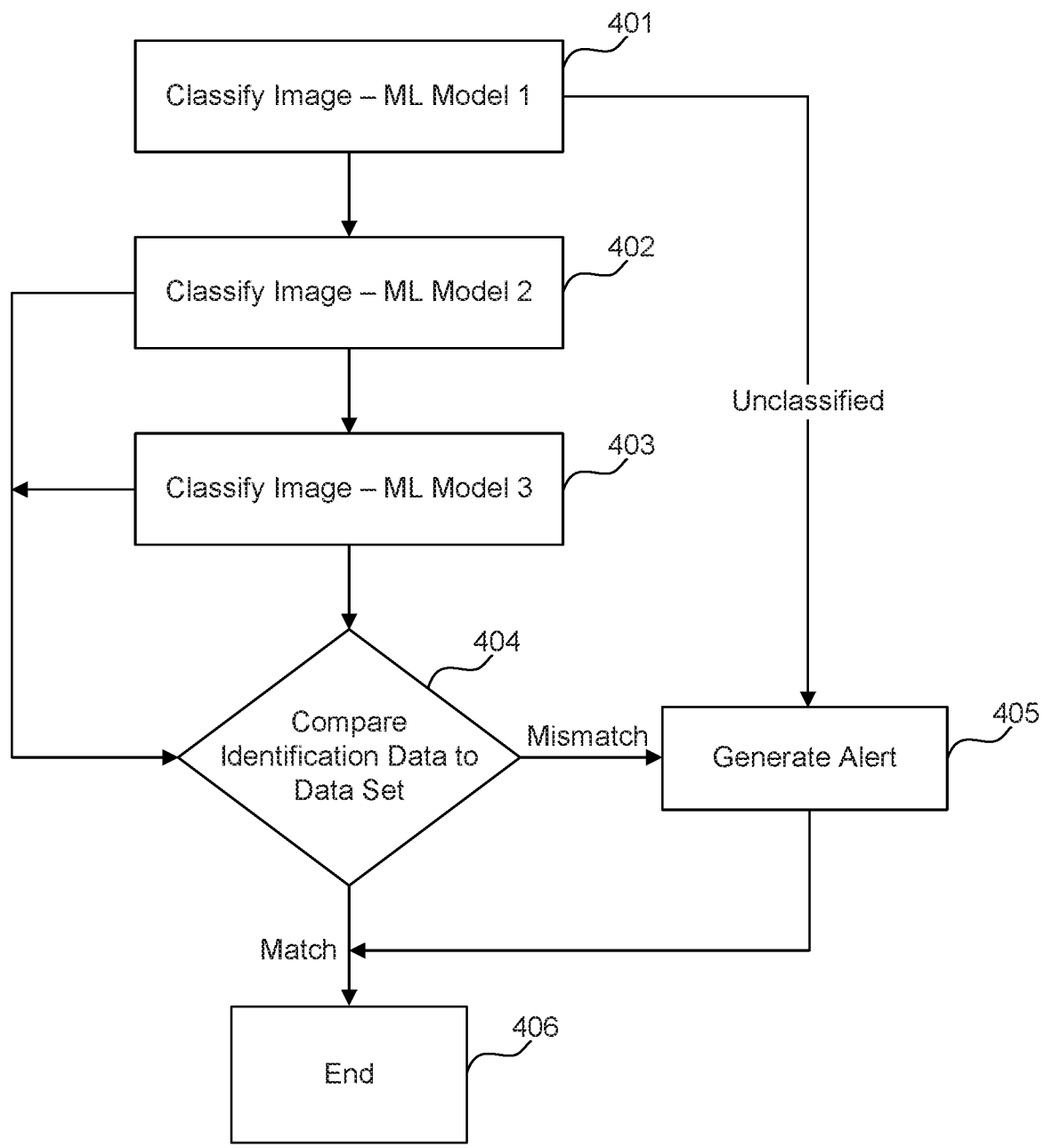
FIG. 4 is a flow chart for a method of image error identification according to an embodiment.

FIG. 4 is a flow chart for a method of image error identification according to an embodiment. It is to be appreciated the steps may not occur in the order shown, not all steps may be performed, and additional steps may be performed, depending on various applications.

According to an embodiment, a method of image error identification comprises the steps illustrated in FIG. 4. In step 401, the image error identification system classifies the image in a first general image class using a first machine learning model, machine learning model 1. According to an embodiment, the first general image class may be vehicle images including vehicle exterior images and vehicle interior images. At each layer of image classification, the image error identification system may generate identification data: for example, vehicle or non-vehicle image from machine learning model 1, vehicle make and model from machine learning model 2, and vehicle features from machine learning model 3. According to an embodiment, if the image error identification system fails to classify the image as a vehicle interior or vehicle exterior, the image error identification system is configured to generate an alert. The alert may include the individual identifier of the vehicle listing and the image or an image identifier, and the alert may further indicate that the image is not a vehicle image. The image identifier may include a path to a local or remote storage location where the image. The path may include a universal resource locator (URL) identifying a location where the image is stored. The image may be retrieved by accessing the network location identified by the URL and copying the image to local storage. In the case that the path identifies a local storage location, the image may be retrieved by copying the image into memory suitable for the image classifier 103 to perform image classification steps on the image.

According to an embodiment, after classifying the image as a vehicle image, the image error identification system uses a second machine learning model, machine learning model 2, at step 402, to classify the image and generate identification data for the image. The identification data generated by the second machine learning model may include a general identifier corresponding to one or more of multiple sub-classes within the first general image class. The general identifier generated by the second machine learning model may include a vehicle make or a vehicle make and model for the image. Identification data may include vehicle make and model based on the image classification performed by machine learning model 2. According to an embodiment, after classifying the image to determine make and model identification data, the image error identification system compares the identification data to the data set. If the data set comprises a make and model different from the make and model in the identification data of the image, the image error detection system detects a mismatch and generates an alert 405.

According to an embodiment, after classifying the image to determine make and model of the vehicle in the image, at step 403 the image error identification system uses a third machine learning model, machine learning model 3 to identify features of the vehicle in the image.

According to an embodiment, at step 404, the image error identification system uses the identification data generated from one or more of the first machine learning model, the second machine learning model, or the third machine learning model in steps 401, 402, and 403 and compares the identification data to corresponding members of the data set. Corresponding members of the data set may be the members of the data set that identify the same information type as the identification data, such as vehicle make, model, body type, or features equivalent to the features included in the identification data. For example, if the third machine learning model identified a manual transmission as a transmission type in step 403, and the corresponding member of the data set indicated an automatic transmission as the transmission type, the comparison at step 404 would find a mismatch. If a mismatch is found, the image error identification system generates an alert at step 405. A mismatch between any part of the identification data and the corresponding member of the data set may be found in isolation or in combination with another mismatch between the identification data and the data set. The image error identification method ends 406.

Figure 5:
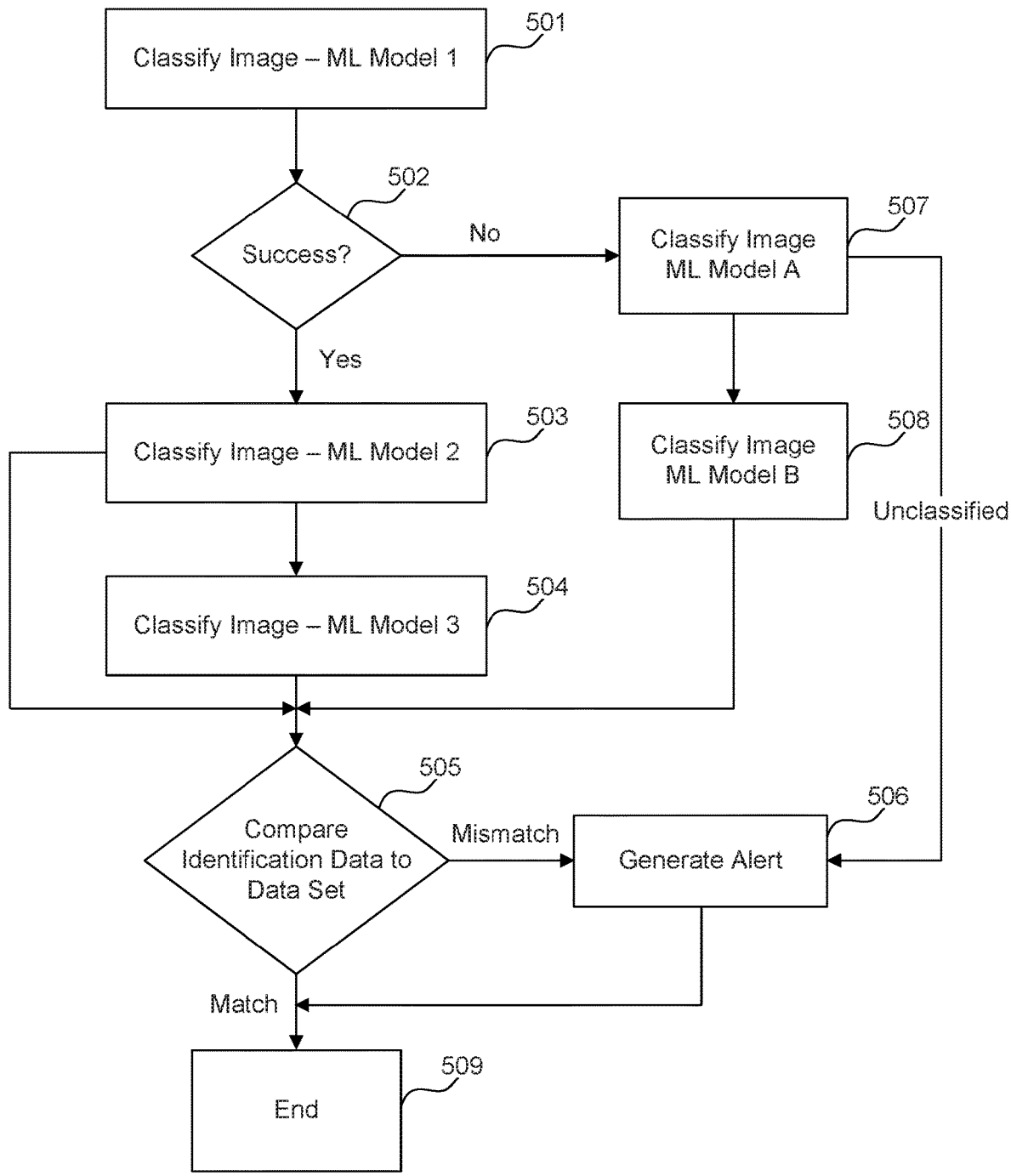
FIG. 5 is a flow chart for a method of image error identification according to an embodiment.

FIG. 5 is a flow chart for a method of image error identification according to an embodiment. It is to be appreciated the steps may not occur in the order shown, not all steps may be performed, and additional steps may be performed, depending on various applications.

At step 501, the image error identification system classifies the image in a first general image class using a first machine learning model, machine learning model 1. The first general image class may include vehicle exterior images. According to an embodiment, at step 502, if the first machine learning model fails to classify the image as an vehicle exterior image, the image error identification system sends the image to an alternate machine learning model, machine learning model A, for classification in a second general image class at step 507. The second general image class may include vehicle interior images. According to an embodiment, if the image remains unclassified after step 507, i.e., the alternate machine learning model fails to classify the image, the image error identification system proceeds to step 506 and generates an alert. The alert may include the individual identifier for the listing corresponding to the image, an identifier of the image, and a notification that the image is not a vehicle image.

According to an embodiment, the image error identification system may identify the make of the vehicle or make and model of the vehicle using a second machine learning model configured to identify a general identifier of a vehicle interior image. For example, some vehicles include an emblem identifying the make of the vehicle in the center of the steering wheel. The image error identification system may detect this steering wheel emblem and generate identification data including the general identifier of the make of the vehicle.

According to an embodiment, after classifying the image using the alternate machine learning model at step 507, the image error identification system sends the image to a third machine learning model, machine learning model B, for feature identification at step 508. Machine learning model B may be configured to generate a feature identifier that identifies interior features including, but not limited to, automatic/manual transmission, seat style, rear seating availability, trim level, interior materials such as leather, cloth, wood or metal, dashboard features, entertainment, navigation, safety features or any other features identifiable from the vehicle interior.

According to an embodiment, after successfully classifying the image as a vehicle image, at step 501 and step 502, the image error identification system uses a second machine learning model, machine learning model 2, at step 503, to classify the image with a general identifier corresponding to one or more of multiple sub-classes within the first general image class. According to an embodiment, after classifying the image to determine make and/or model identification data, the image error identification system may compare the identification data to the data set. If a mismatch exists between the make in the data set and the make in the identification data, or a mismatch exists between the model in the data set and the model in the identification data, the image error detection system generates an alert at step 506.

According to an embodiment, after classifying the image to determine make and model of the vehicle in the image, the image error identification system uses a third machine learning model, machine learning model 3, at step 504 to identify features of the vehicle in the image. The identification data may further include the features identified using the third machine learning model.

According to an embodiment, at step 505, the image error identification system uses the identification data generated from one or more of the first machine learning model, the second machine learning model, or the third machine learning model in steps 501, 503, and 504 and compares the identification data to the corresponding members of the data set. For example, if the third machine learning model identified a manual transmission in step 504 or step 508, and the corresponding member of the data set indicated an automatic transmission, the comparison at step 505 would find a mismatch. If a mismatch is found, the image error identification system generates an alert at step 506. The image error identification method ends at step 509.

Figure 6:
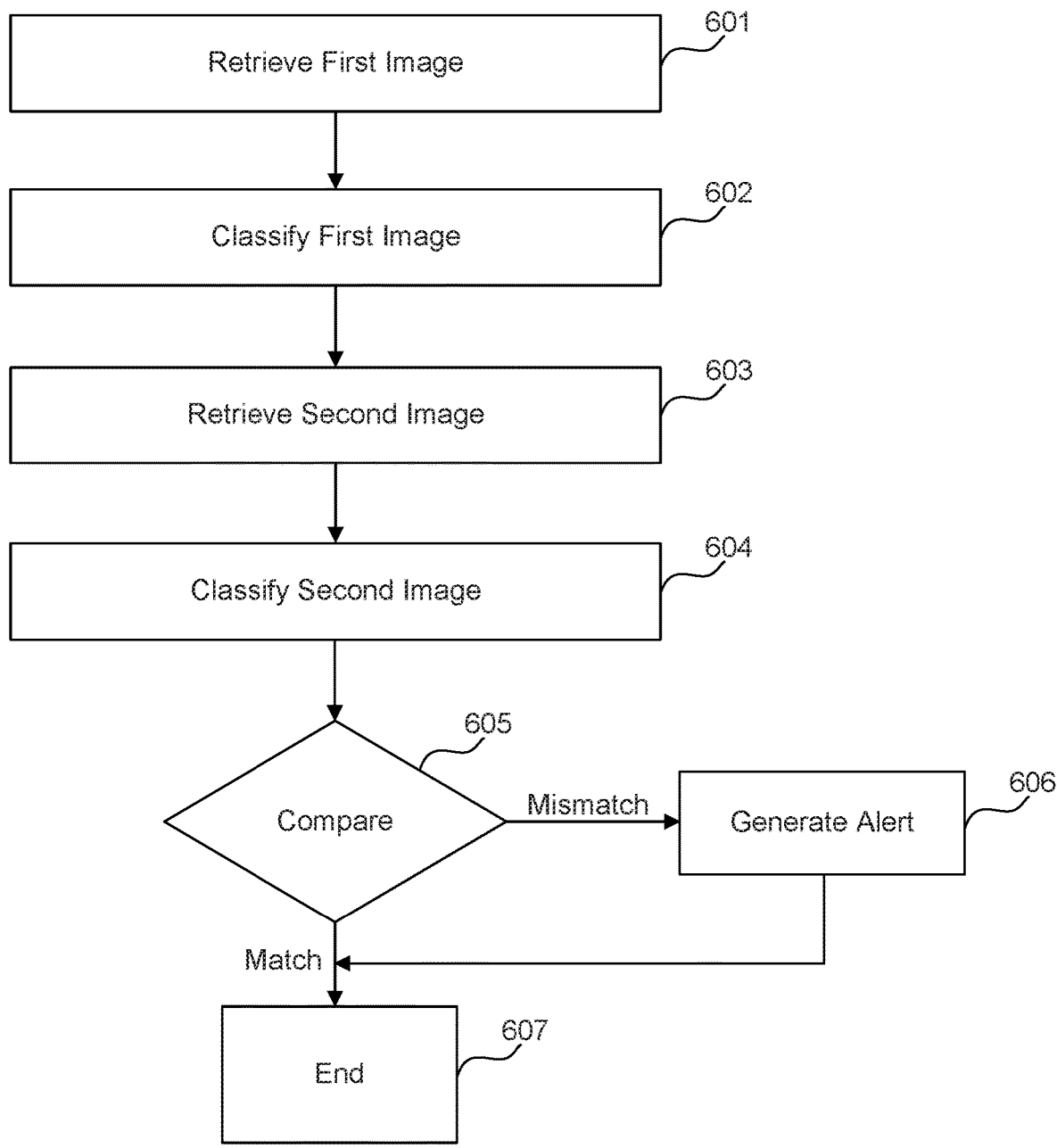
FIG. 6 is a flow chart for a method of identifying image errors through comparison of two images according to an embodiment.

FIG. 6 is a flow chart for a method of identifying image errors through comparison of two images according to an embodiment. It is to be appreciated the steps may not occur in the order shown, not all steps may be performed, and additional steps may be performed, depending on various applications.

In some embodiments, the method illustrated in FIG. 6 may be used to determine if two images, both associated with a single vehicle listing, are consistent with each other. The image error identification system may be configured to compare two images and determine whether a mismatch exists between the two images in addition to determining whether a mismatch exists between an image and the members of the vehicle listing data set.

At step 601, the image error identification system retrieves a first image. The first image corresponds to vehicle listing associated with an individual identifier. At step 602, image error identification system classifies the first image. Retrieving and classifying the first image may be done according to any of the embodiments disclosed herein.

At step 603, the image error identification system retrieves a second image. The second image corresponds to the same vehicle listing and individual identifier as the first image. At step 604, the image error identification system classifies the second image. Retrieving and classifying the second image may be done according to any of the embodiments disclosed herein. Classification of the first image and the second image produces first identification data corresponding to the first image and second identification data corresponding to the second image.

At step 605, the image error identification system compares the first identification data to the second identification data. If the first identification data and second identification data are mismatched, the image error identification system generates an alert at step 606. A mismatch may occur, for example if the make and model of the first image is different from the make and model of the second image. However, a mismatch will not necessarily be triggered simply because the first identification data and second identification data are different. For example, a mismatch may not be triggered if the first identification data comprises a make model, trim, and one or more exterior features of the vehicle, while the second identification data may include one or more interior features of the vehicle. However, a mismatch may be triggered if, for example, the first identification data comprises a sedan vehicle type capable of seating five passengers while the second identification data comprises seven passenger seating. The image error identification method ends at step 607.

Figure 7:
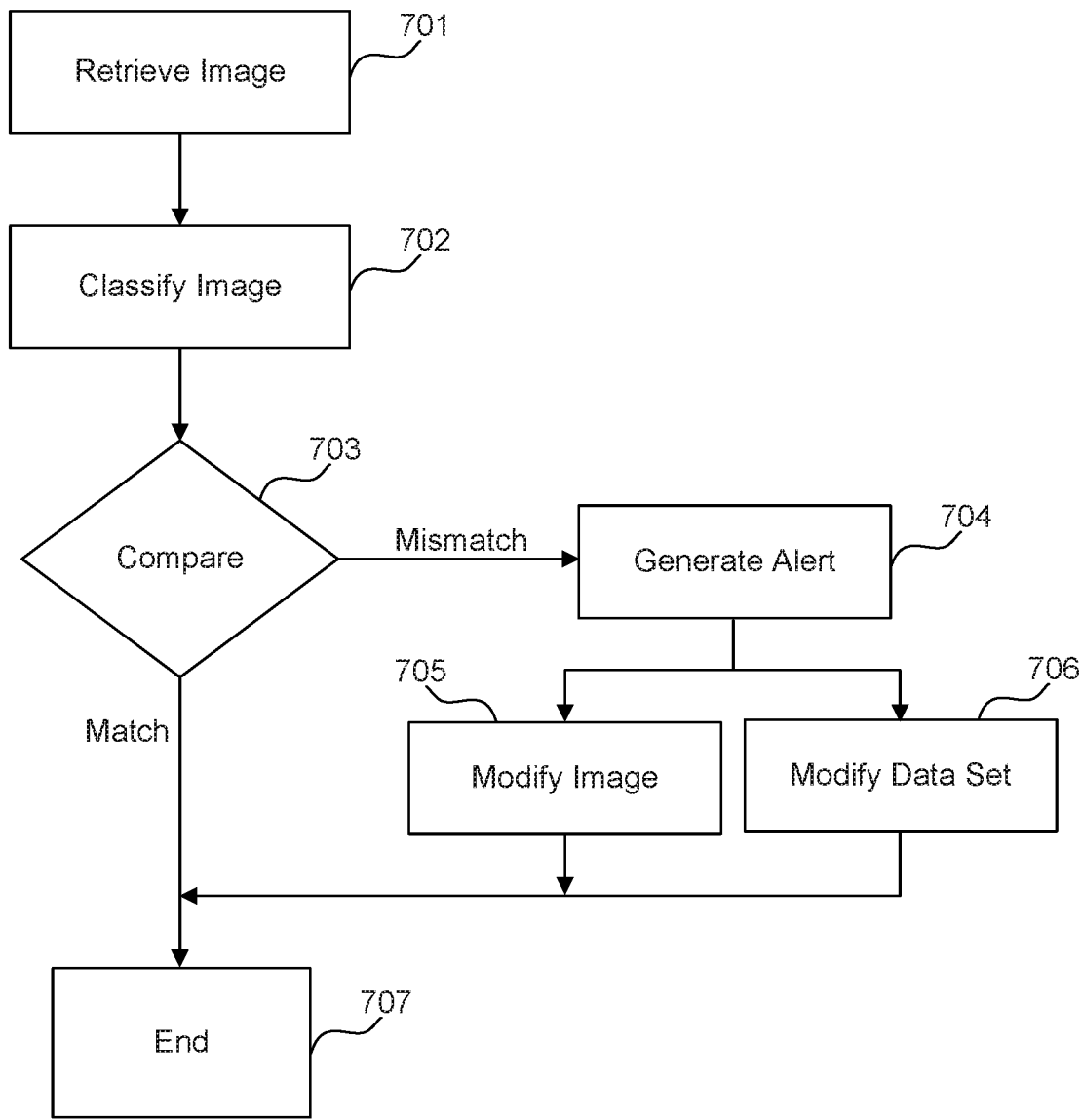
FIG. 7 is a flow chart for a method of image error identification and modification to correct the identified error according to an embodiment.

FIG. 7 is a flow chart for a method of image error identification and modification to correct the identified error according to an embodiment. It is to be appreciated the steps may not occur in the order shown, not all steps may be performed, and additional steps may be performed, depending on various applications.

At step 701, the image error identification system retrieves an image. At step 702, the retrieved image is classified. Retrieving and classifying the image may be performed according to any of the embodiments disclosed herein. At step 703, the image error identification system compares the identification data generated from image classification to corresponding members of the data set for the vehicle listing. If a mismatch is detected between the identification data and one or more members of the data set, the image error identification system generates an alert at step

704. According to an embodiment, the generated alert may include notification that the error will be automatically corrected.

According to an embodiment, the comparison of step 703 may indicate that either the image or the data set is incorrect. The image may be determined to be incorrect if the identification data for the image is inconsistent with multiple members of the data set for the vehicle listing. Alternatively, a member of the data set may be determined to be incorrect if the member of the data set is inconsistent with the identification data and/or inconsistent with another member of the data set. The member of the data set may also be determined to be incorrect if the member of the data set is inconsistent with the identification data, and the identification data matches other members of the data set and/or matches identification data of other images of the vehicle listing.

At step 705, the image error identification system modifies the image to correct a mismatch detected between the identification data of the image and the data set of the vehicle listing. Modification of the data may include removing the image or replacing the image with another image known to be the correct image. At step 706, the image error identification system modifies the data set to correct a mismatch detected between the identification data of the image and the data set of the vehicle listing. Modification of the data set may include deleting the member of the data set, or changing the member of the data set to match the identification data. For example, the data set may include a member indicating leather seats, while the identification data may include an indication of two-tone cloth and leather seats. The method may update the member of the data set to match the identification data generated from image classification.

After modifying the image in step 705 or the data set in step 706, or if no mismatch is detected, the method ends at step 707.

Figure 8:
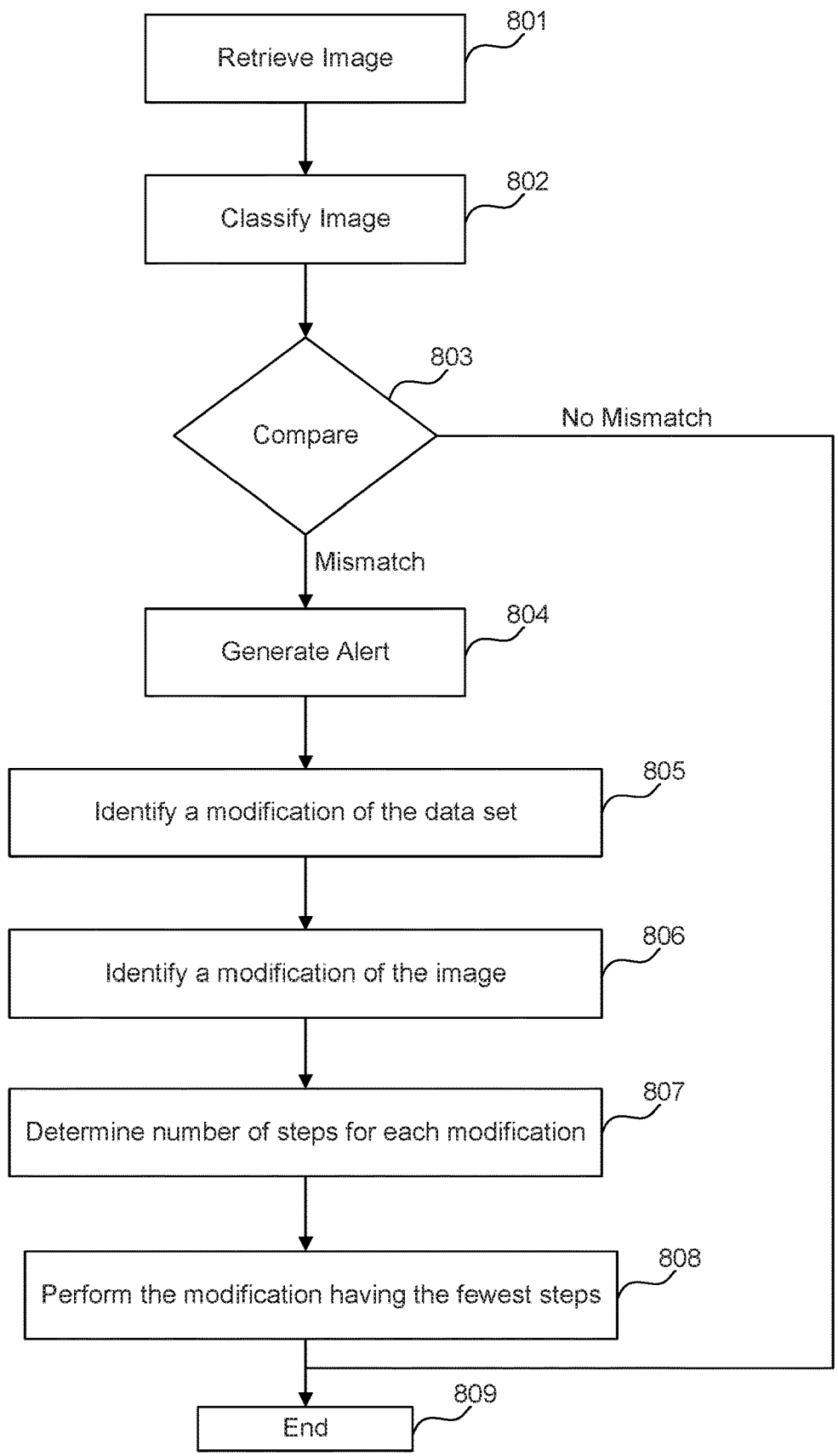
FIG. 8 is a flow chart for a method of image error identification and modification to correct the identified error according to an embodiment.

FIG. 8 is a flow chart for a method of image error identification and modification to correct the identified error according to an embodiment. It is to be appreciated the steps may not occur in the order shown, not all steps may be performed, and additional steps may be performed, depending on various applications.

At steps 801, 802, 803, and 804, the image error identification system respectively retrieves an image, classifies the image, compares the identification data generated by image classification, and generates an alert according to any of the embodiments disclosed herein.

At step 805, the image error identification system identifies a potential modification of the data set. The modification may be one or more modifications that eliminate a detected inconsistency between the identification data and the data set of the vehicle listing, which triggered the generation of the alert.

At step 806, the image error identification system identifies a potential modification of the image. The image modification may be any image modification that eliminates the inconsistency between the identification data and the data set of the vehicle listing, including deleting the image from the vehicle listing or replacing the image with another image known to be correct.

At step 807, the image error identification system determines a number of steps required to complete the identified modification of the data set, and the number of steps required to complete the identified modification of the image. For example, when the image is incorrect, it will likely produce multiple inconsistencies between the identification data and the data set of the vehicle listing. In this case, consistency between the image and the rest of the vehicle listing may be restored by either deleting the image, which is one step, or by changing every member of the data set that is inconsistent with the image, which may be several steps. The image error identification system may be configured to correct errors by choosing the modification most likely to correct the error and least likely to introduce additional errors into the vehicle listing. According to an embodiment, the image error identification system is configured to perform the modification having the fewest steps. At step 808, the image error identification system performs the modification having the fewest steps. In the example described above, this modification performed may be deleting the image from the vehicle listing. At step 809, the method ends.

The image error identification system may perform image classification and comparison to the vehicle listing data set for each image of a vehicle listing and for each vehicle listing in a database. A mismatch may include a mismatch between the identification data of the image and one member of the vehicle listing data set or mismatches between the identification data of the image and multiple members of the vehicle listing data set.

Figure 9:
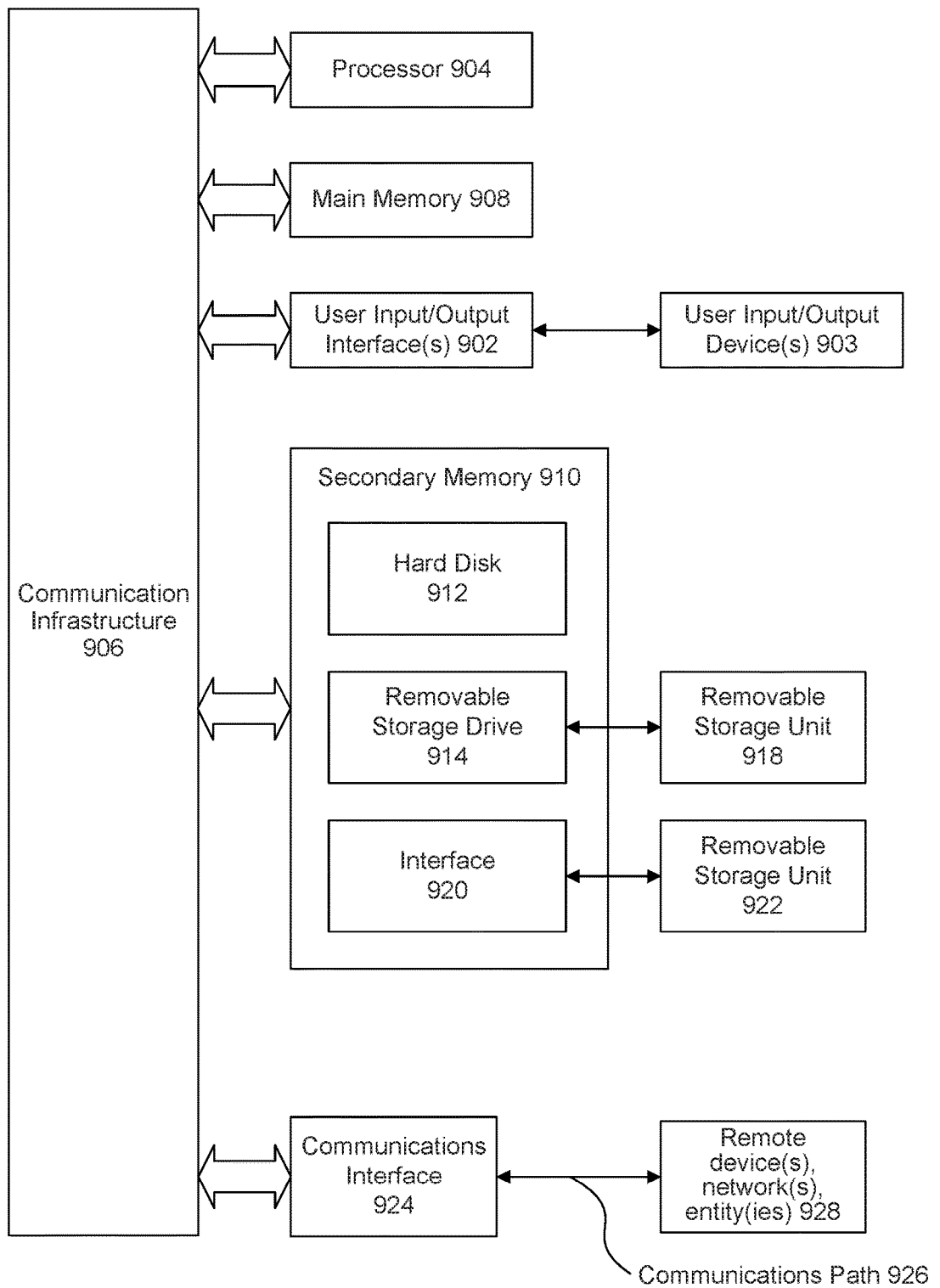
FIG. 9 is a block diagram of an example computer system useful for implementing various embodiments disclosed herein.

FIG. 9 is a block diagram of an example computer system useful for implementing various embodiments disclosed herein.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache and/or registers. Main memory 908 may have stored therein control logic (i.e., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture including a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method comprising:
   retrieving an image from a data set corresponding to an individual identifier;
   classifying, using a first machine learning model, the image to determine a first portion of identification data for the image;

classifying, using a second machine learning model, the image to determine a second portion of the identification data, in response to successfully classifying the image using the first machine learning model;

comparing at least one portion of the identification data to a member of the data set to determine whether there is a mismatch between the at least one portion of the identification data and the member of the data set; and generating a mismatch alert to indicate an error in the data set, in response to the mismatch between the at least one portion of the identification data and the member of the data set.

2. The method of claim 1, wherein the retrieving of the image from the data set further comprises:

retrieving an image identifier from the data set, wherein the image identifier includes a universal resource locator (URL) identifying a local or remote storage location that stores the image; and retrieving the image corresponding to the image identifier from the local or remote storage location.

3. The method of claim 1, wherein
the first portion of the identification data comprises a first general image class, and
the first general image class comprises an exterior image class associated with an exterior image of a vehicle.

4. The method of claim 3, wherein the second portion of the identification data comprises a general identifier for the image, the general identifier corresponds to one or more sub-classes of a plurality of sub-classes within the first general image class,
the generating of the mismatch alert is in response to a mismatch between the second portion of the identification data comprising the general identifier and the member of the data set, and
the member of the data set comprises an identifier from the plurality of sub-classes.

5. The method of claim 3, further comprising:
classifying, using a third machine learning model, the image to determine a third portion of the identification data, wherein
the second portion of the identification data comprises a general identifier for the image, and
the third portion of the identification data comprises an indication of a feature in the image.

6. The method of claim 5, wherein
the individual identifier identifies a vehicle listing and the data set is a vehicle listing data set,
the member of the data set corresponds to the feature in the image, and
the generating of the mismatch alert is in response to a mismatch between the third portion comprising the indication of the feature and the member of the data set corresponding to the feature.

7. The method of claim 1, further comprising modifying the image from the data set, in response to the mismatch between the at least one portion of the identification data and the member of the data set.

8. The method of claim 1, further comprising modifying the member of the data set in response to the mismatch between the at least one portion of the identification data and the member of the data set.

9. The method of claim 1, further comprising:
identifying a first modification, among two or more candidate modifications, the first modification comprising modifying the member of the data set;
identifying a second modification, among the two or more candidate modifications, the second modification comprising replacing the image to change the identification data;
for each of the first modification and the second modification, determining a number of steps required to eliminate mismatches between the identification data and all members of the data set; and
performing a modification, among the two or more candidate modifications, having least number of steps.

10. A system comprising:
a processor; and
a memory coupled to the processor, wherein the processor and the memory are configured to:
retrieve an image from a data set corresponding to an individual identifier;
classify, using a first machine learning model, the image to determine a first portion of identification data for the image;
classify, using a second machine learning model, the image to determine a second portion of the identification data, in response to successfully classifying the image using the first machine learning model;
compare at least one portion of the identification data to a member of the data set to determine whether there is a mismatch between the at least one portion of the identification data and the member of the data set; and
generate a mismatch alert to indicate an error in the data set, in response to the mismatch between the at least one portion of the identification data and the member of the data set.

11. The system of claim 10, wherein the processor and the memory are further configured to:
retrieve an image identifier from the data set, wherein the image identifier includes a universal resource locator (URL) identifying a local or remote storage location that stores the image; and
retrieve the image corresponding to the image identifier, from the local or remote storage location.

12. The system of claim 10, wherein
the first portion of the identification data comprises a first general image class, and
the first general image class comprises an exterior image class associated with an exterior image of a vehicle.

13. The system of claim 12, wherein
the second portion of the identification data comprises a general identifier for the image,
the general identifier corresponds to one or more of a plurality of sub-classes within the first general image class,
the generation of the mismatch alert is in response to a mismatch between the second portion of the identification data comprising the general identifier and the member of the data set, and
the member of the data set comprises an identifier from the plurality of sub-classes.

14. The system of claim 12, wherein the processor and the memory are further configured to:
classify, using a third machine learning model, the image to determine a third portion of the identification data, wherein
the second portion of the identification data comprises a general identifier for the image, and
the third portion of the identification data comprises an indication of a feature in the image.

15. The system of claim 14, wherein
the individual identifier identifies a vehicle listing and the data set is a vehicle listing data set;
the member of the data set corresponds to the feature in the image, and
the generation of the mismatch alert is in response to a mismatch between the third portion comprising the indication of the feature and the member of the data set corresponding to the feature.

16. The system of claim 10, wherein the processor and the memory are further configured to:
classify, using an alternate machine learning model, the image to determine a third portion of the identification data, in response to a failure to classify the image using the first machine learning model, wherein the third portion of the identification data comprises a second general image class; and
generate a classification failure alert, in response to failures to classify the image using the first machine learning model and the alternate machine learning model, wherein the classification failure alert includes a notification that the image is not a vehicle image.

17. The system of claim 10, wherein the processor and the memory are further configured to modify the image from the data set, in response to the mismatch between the at least one portion of the identification data and the member of the data set.

18. The system of claim 10, wherein the processor and the memory are further configured to modify the member of the data set in response to the mismatch between the at least one portion of the identification data and the member of the data set.

19. The system of claim 10, wherein the processor and the memory are further configured to:
determine a first modification, among two or more candidate modifications, the first modification comprising modifying the member of the data set;
determine a second modification, among the two or more candidate modifications, the second modification comprising replacing the image to change the identification data;
for each of the first modification and the second modification, determine a number of steps required to eliminate mismatches between the identification data and all members of the data set;
perform a modification, among the two or more candidate modifications, having least number of steps.

20. A non-transitory computer-readable device having instructions stored thereon that, when executed by at least one computing device, cause the at least one computing device to perform operations comprising:
retrieving an image from a data set corresponding to an individual identifier;
classifying, using a first machine learning model, the image to determine a first portion of identification data for the image;
classifying, using a second machine learning model, the image to determine a second portion of the identification data, in response to successfully classifying the image using the first machine learning model;
comparing at least one portion of the identification data to a member of the data set to determine whether there is a mismatch between the at least one portion of the identification data and the member of the data set; and
generating a mismatch alert to indicate an error in the data set, in response to the mismatch between the at least one portion of the identification data and the member of the data set.

* * * * *